United States Patent [19]

Schumacher, II

[11] Patent Number: 4,731,183
[45] Date of Patent: Mar. 15, 1988

[54] FILTER WITH VALVE-IN-HEAD CONSTRUCTION

[75] Inventor: Robert G. Schumacher, II, Sheboygan Falls, Wis.

[73] Assignee: Ametek, Inc., Sheboygan, Wis.

[21] Appl. No.: 7,324

[22] Filed: Jan. 27, 1987

[51] Int. Cl.$^4$ .............. B01D 29/42; B01D 35/30
[52] U.S. Cl. .................. 210/419; 210/424; 210/435; 210/444
[58] Field of Search .............. 210/100, 232, 234, 424, 210/419, 435, 440, 444, 447–449; 137/549, 614.11; 251/251, 324

[56] References Cited

U.S. PATENT DOCUMENTS

| | | | |
|---|---|---|---|
| 3,105,042 | 9/1963 | Roosa | 210/444 |
| 3,426,998 | 2/1962 | Kintner | 251/324 |
| 3,746,171 | 7/1973 | Thomsen | 210/444 |
| 3,777,889 | 12/1973 | Henderson | 210/133 |
| 3,853,761 | 12/1974 | McClory | 210/449 |
| 3,935,106 | 1/1976 | Lipner | 210/444 |
| 4,046,696 | 9/1977 | Mouwen | 210/431 |
| 4,082,673 | 4/1978 | Cilento | 210/429 |
| 4,271,020 | 6/1981 | Van Meter | 210/421 |
| 4,379,053 | 4/1983 | Brane | 210/419 |
| 4,504,389 | 3/1985 | Rundzaitis | 210/424 |

FOREIGN PATENT DOCUMENTS

| | | | |
|---|---|---|---|
| 3043482 | 6/1982 | Fed. Rep. of Germany | 251/251 |
| 1213805 | 4/1960 | France | 251/324 |

Primary Examiner—Richard V. Fisher
Assistant Examiner—Richard D. Jordan
Attorney, Agent, or Firm—Andrus, Sceales, Starke & Sawall

[57] ABSTRACT

A valve-in-head filter includes an outer housing (2) adapted to receive a fluid filter cartridge (4) therein. A valve head (7) is provided which includes an annular stand pipe (22) for locating an end of the filter. The stand pipe is cut away (32) on its downstream side to reduce fluid back pressure. Furthermore, a passage (13) is disposed between the head inlet (11) and outlet (12), with the passage receiving a slidable plunger (23) therein. A manually actuatable handle (28) connects through a rotary actuator (29) to move the plunger. The actuator includes a stem (30) mounted eccentrically to the handle axis, with the stem received in a recess (31) in the plunger so that turning of the handle moves the plunger between "on" and "off" positions. The plunger includes a seal (26) which continuously engages the passage wall in all plunger positions, and the construction provides full "on" and "off", with no fluid bypass in the "off" position.

5 Claims, 5 Drawing Figures

FILTER WITH VALVE-IN-HEAD CONSTRUCTION

PRIOR ART OF INTEREST

| Patent No. | Inventor | Issue Date |
|---|---|---|
| 3,746,171 | Thomsen | July 17, 1973 |
| 3,777,889 | Henderson | December 11, 1973 |
| 3,853,761 | McClory | December 10, 1974 |
| 3,935,106 | Lipner | January 27, 1976 |
| 4,082,673 | Cilento | April 4, 1978 |
| 4,271,020 | Van Meter | June 2, 1981 |

BACKGROUND AND SUMMARY OF THE INVENTION

This invention relates to a filter with a valve-in-head construction. The filter is adapted for household and other uses for filtering fluid flowing through a pipeline. The above identified patents illustrate filters of this general type. Normally, such filters include an outer housing which is adapted to receive a replaceable filter cartridge. One end of the housing is closed, while the other end is adapted to receive a removable valve head which connects to the fluid line for selective fluid flow through the filter.

Various constructions of valve heads are shown in the above patents. Some of them, such as U.S. Pat. No. 3,777,889, include an annular "stand pipe" which telescopes into the core portion of the filter to locate it. Some also include inlets and outlets which are diametrically opposed, as in U.S. Pat. No. 4,271,020. Others, such as U.S. Pat. No. 3,853,761, utilize suitably actuated sliding spools which control the fluid flow within the valve. Some known devices also provide a bypass of portions of the fluid around the valve, even when it is in the "off" position.

It is an object of the present invention to provide a valve-in-head filter arrangement which is improved over the previously known structures.

In accordance with the various aspects of the invention, the device is for use with an outer housing adapted to receive a fluid filter cartridge therein. A valve head is provided which includes an annular stand pipe for locating an end of the filter. The stand pipe is cut away on its downstream side to reduce fluid back pressure. Furthermore, a passage is disposed between the head inlet and outlet, with the passage receiving a slideable plunger therein. An actuatable device connects through a rotary actuator to move the plunger. The actuator includes a stem mounted eccentrically to the handle axis, with the stem received in a recess in the plunger so that turning of the handle moves the plunger between "on" and "off" positions. The plunger includes a seal which continuously engages the passage wall in all plunger positions, and the construction provides full "on" and "off", with no fluid bypass in the "off" position.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
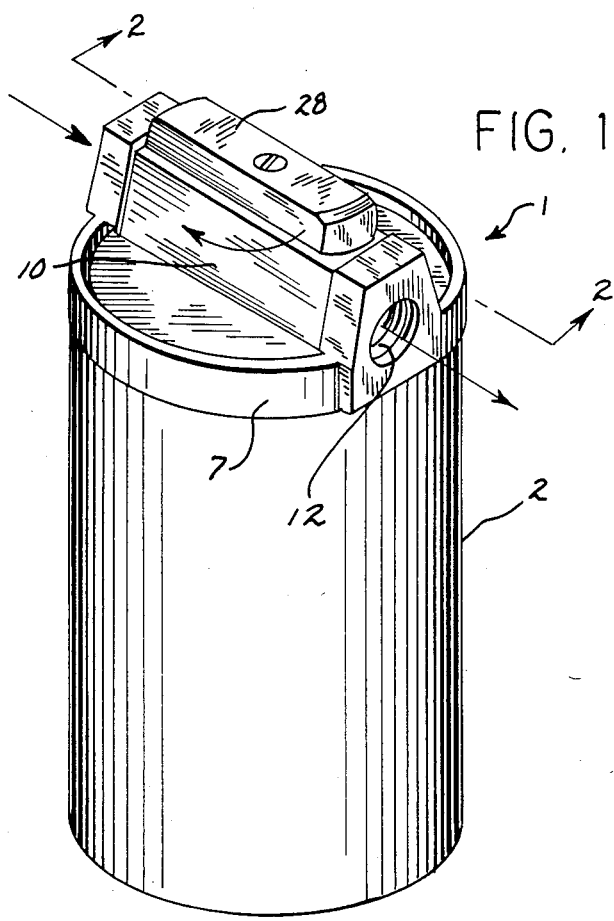
FIG. 1 is a perspective view of a valve-inhead filter constructed in accordance with the various aspects of the invention.
Figure 4:
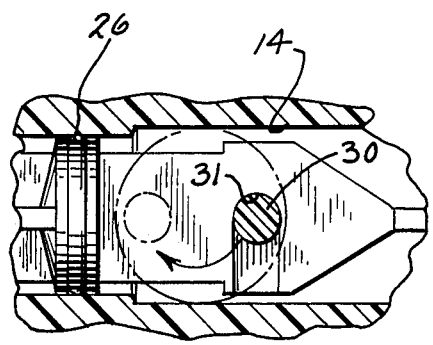
FIG. 4 is a horizontal section taken on line 4—4 of FIG. 2.

As shown in the drawings, a filter device 1 includes a cylindrical housing 2 defining an axis 102 and which is normally closed at its lower end and open at its upper end and forms an internal chamber 3 therein. Chamber 3 is adapted to receive an elongated annular sleeve-like filter cartridge 4 made of any suitable well-known material for filtering fluid flowing therethrough. Cartridge 4 is provided with an inner wall 5 which defines an axially extending core 6 which is open or hollow at least at its top end.

A valve head 7 is adapted to be removably secured to the open upper end of housing 2 and includes a lower threaded portion 8 for threading onto a corresponding threaded portion 9 of housing 2.

The body 10 of head 7 above threaded portion 8 is formed with a fluid inlet 11, a fluid outlet 12 disposed diametrically across from inlet 11, and a transverse passage 13 extending therebetween. Passage 13 is defined by an annular internal wall 14 which is enlarged in diameter as at 15 adjacent outlet 12 and reduced in diameter as at 16 adjacent inlet 11.

When the valve is open, passage 13 is adapted to be in fluid flow communication with housing chamber 3. For this purpose, a channel 17 connects the inlet end portion of valve passage 13, inwardly of wall 16, with chamber 3. In addition, body 10 includes an annular rib 18 which extends downwardly therefrom in coaxial alignment with housing chamber 3. A further channel 19 is formed between rib 18 and passage 13 to also connect the latter with chamber 3.

Rib 18 is provided with a tapered generally pointed edge 20 which is adapted to engage a cap 21 disposed on the end of filter 4, thus tending to hold the filter axially in place.

An annular pipe-like locator 22, sometimes called a "stand pipe", extends downwardly and coaxially within rib 18. Locator 22 furthermore is adapted to telescope within filter core wall 5 for purposes of holding the filter in axial alignment within housing 2.

A unitary slideable plunger 23 is disposed within valve passage 13 and includes a plunger body 24 and means for selectively sealing the plunger against passage wall 14. For this purpose, an O-ring 25 is disposed at the inlet end of plunger 23 and has a diameter such as to seal against reduced end wall 16. A further O-ring 26 is spaced inwardly from O-ring 25 and has a diameter such as to seal against the central portion of passage 14. Yet another O-ring 27 is disposed at the outlet end of plunger 23 and has a diameter such as to also seal against the central portion of passage 14, but not against enlarged end wall 15.

Means are provided to slideingly shift plunger 23 between end positions within passage 13 to open and close the valve. For this purpose, a manually actuatable handle 28 is mounted for rotation about the housing axis 102 and is connected to a rotary actuator 29 which extends downwardly into valve body 10 and into passage 13. The inner end of actuator 29 is provided with a stem 30 which is eccentric to and offset from axis 102, and which is received within a recess 31 disposed in plunger body 24. Rotation of handle 28 and actuator 29 causes stem 30 to drive the plunger back and forth within passage 13.

Figure 2:
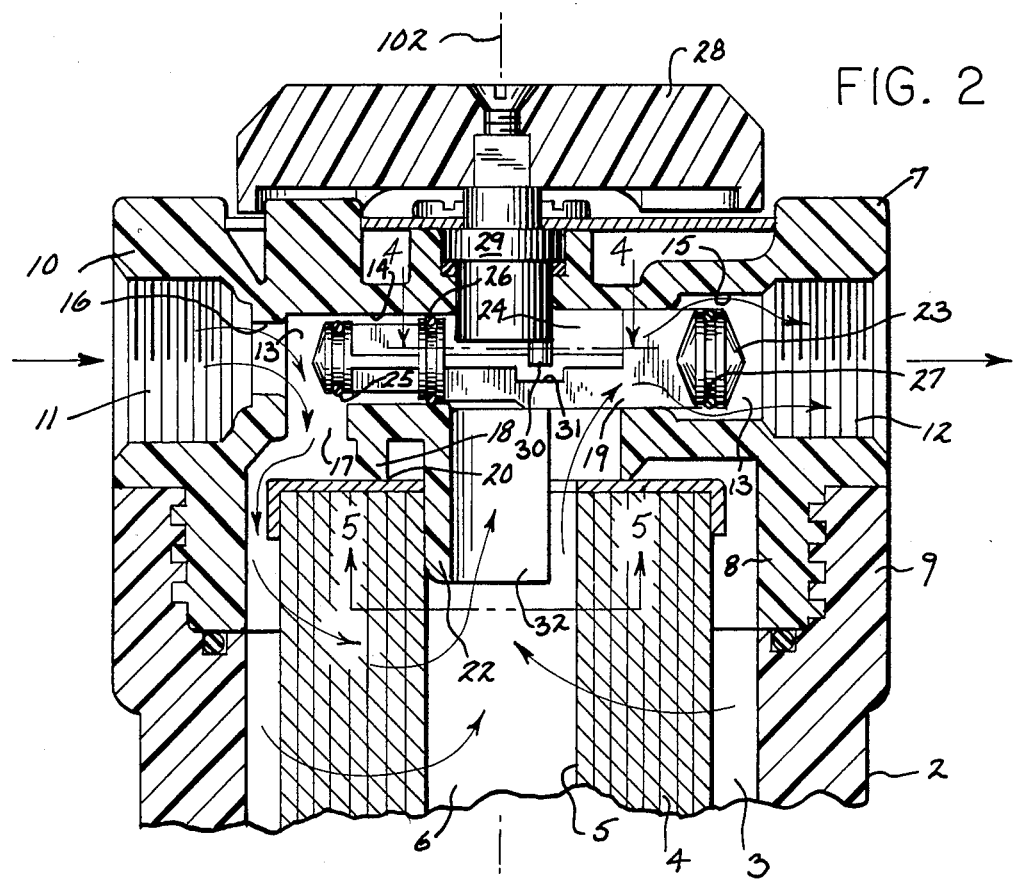
FIG. 2 is a fragmentary vertical section of the filter taken on line 2—2 of FIG. 1 and with the valve in open or "on" position.

Referring to FIG. 2, which shows the valve in open position, plunger 23 is in its rightmost position as adjusted by eccentric stem 30. O-ring 25 is spaced from passage wall 14, O-ring 26 is in engagement with wall 14 between the other O-rings, and O-ring 27 is spaced from enlarged passage wall portion 15. Fluid flows through inlet 11 and past reduced wall 16, through channel 17 into chamber 3 on the exterior of filter 4, inwardly through the filter, upwardly through channel 19, and hence past O-ring 27 and through outlet 12.

Figure 5:
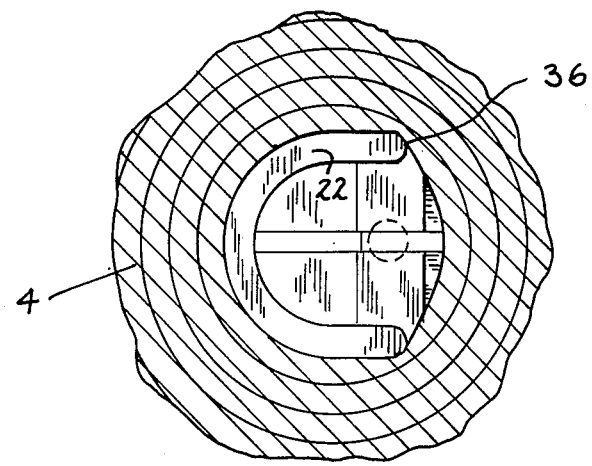
FIG. 5 is a horizontal section taken on line 5—5 of FIG. 2.

Means are provided to assist the flow of fluid and reduce back pressure as fluid flows from within filter core 6 to channel 19. For this purpose, and as best shown in FIGS. 2 and 5, locator 22 is cut back on its downstream side, as at 32, to provide a slot of less than 180° to enlarge the area of fluid flow. The fluid not only flows outwardly along rib 18 and around locator 22, but also within and through locator 22 itself and open portion 32 to channel 19.

Figure 3:
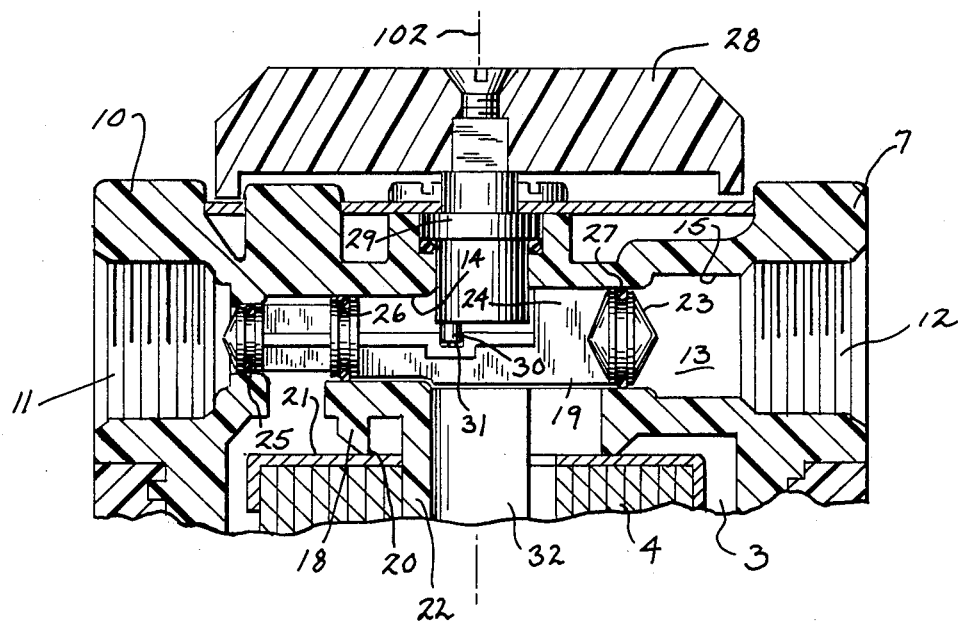
FIG. 3 is a view similar to FIG. 2 with the valve in closed or "off" position.

Now referring to FIG. 3, which shows the valve in closed position, plunger 23 is in its leftmost position as adjusted by stem 30. O-ring 25 is sealed against reduced passage wall portion 16, and O-rings 26 and 27 are sealed against the central passage wall portion 14 on either side of rotary actuator 29. The construction is such in the closed position that fluid flow is completely blocked at inlet 11, there being no bypass around to outlet 12.

It should further be noted that the intermediate O-ring 26 is continuously sealed against the central passage wall portion 14 in both open and closed valve positions as well as therebetween, thus preventing undesirable drainage through the system in all plunger positions.

The various aspects of the invention provide an improved valve-in-head filter arrangement which is relatively inexpensive to manufacture and maintain, and which is efficient in operation.

Various modes of carrying out the invention are contemplated as being within the scope of the following claims which particularly point out and distinctly claim the subject matter of the invention.

I claim:

1. For use in a device for filtering fluids and wherein the device includes a housing forming a chamber for receiving a filter cartridge, a valve head assembly (7) for attachment to the said housing, said assembly comprising, in combination:
   (a) a valve body (10) having an axis (102) and having a fluid inlet (11) and a fluid outlet (12),
   (b) a walled passage (13) disposed in said body and extending between said inlet and outlet,
   (c) a plunger (23) slideably disposed in said passage,
   (d) a rotary plunger actuator (29) mounted for rotation on said axis,
   (e) means (28) for rotating said actuator,
   (f) eccentric drive means (30, 31) connected to said plunger and said actuator, said drive means being responsive to said actuator rotating means to selectively position said plunger within said passage at closed and open valve positions,
   (g) said eccentric drive means comprising:
      (1) means defining a recess (31) disposed in said plunger (23),
      (2) and a stem (30) extending from said rotary plunger actuator (29) to within said recess, said stem being offset from said axis (102),
   (h) a locator (22) extending from said valve body (10) and with said locator being adapted to engage and locate a filter cartridge relative to its housing,
   (i) the construction being such that fluid flows around said locator when said plunger is in an open valve position,
   (j) and means (32) formed by said locator to reduce back pressure of fluid flowing therearound,
   (k) said locator (22) being generally annular and said back pressure reducing means comprising a cut-back open portion (32) disposed in said locator so that fluid flows freely therethrough.

2. The valve head assembly of claim 1 which includes:
   (a) first sealing means (25) disposed on said valve plunger (23) adjacent said inlet (11) for selectively engaging a wall (16) of said passage (13),
   (b) second sealing means (27) disposed on said plunger adjacent said outlet (12) for selectively engaging a wall (14) of said passage,
   (c) and third sealing means (26) disposed on said plunger between said first and second sealing means,
   (d) said third sealing means continuously engaging a wall (14) of said passage in all positions of said plunger.

3. The valve head assembly of claim 2 in which said walled passage (14) includes:
   (a) a reduced diameter portion (16) adjacent said inlet (11) which is engaged by said first sealing means (25) when said valve is in closed position,
   (b) and an enlarged diameter portion (15) adjacent said outlet (12) which is spaced from said second sealing means (27) when said valve is in open position.

4. The valve head assembly of claim 3 wherein the construction is such that when said plunger (23) is in the closed valve position, fluid flow between said inlet (11) and said outlet (12) is completely blocked.

5. For use in a device for filtering fluids and wherein the device includes a housing forming a chamber for receiving a filter cartridge, a valve head assembly (7) for attachment to the said housing, said assembly comprising, in combination:
   (a) a valve body (10) having an axis (102) and having a fluid inlet (11) and a fluid outlet (12),
   (b) a walled passage (13) disposed in said body and extending between said inlet and outlet,
   (c) a plunger (23) slideably disposed in said passage,
   (d) means (284 31) to position said plunger within said passage at closed and open valve positions,
   (e) a locator (22) extending from said valve body (10) and with said locator being adapted to engage a filter cartridge relative to its housing,
   (f) the construction being such that fluid flows around said locator when said plunger is in an open valve position,
   (g) and means (32) formed by said locator to reduce back pressure of fluid flowing therearound,
   (h) locator (22) being generally annular and said back pressure reducing means comprising a cut-back open portion (32) disposed in said locator so that fluid flows freely therethrough.

* * * * *